(Model.)
H. W. PUTNAM.
STOPPER FOR JARS, &c.
No. 256,857. Patented Apr. 25, 1882.
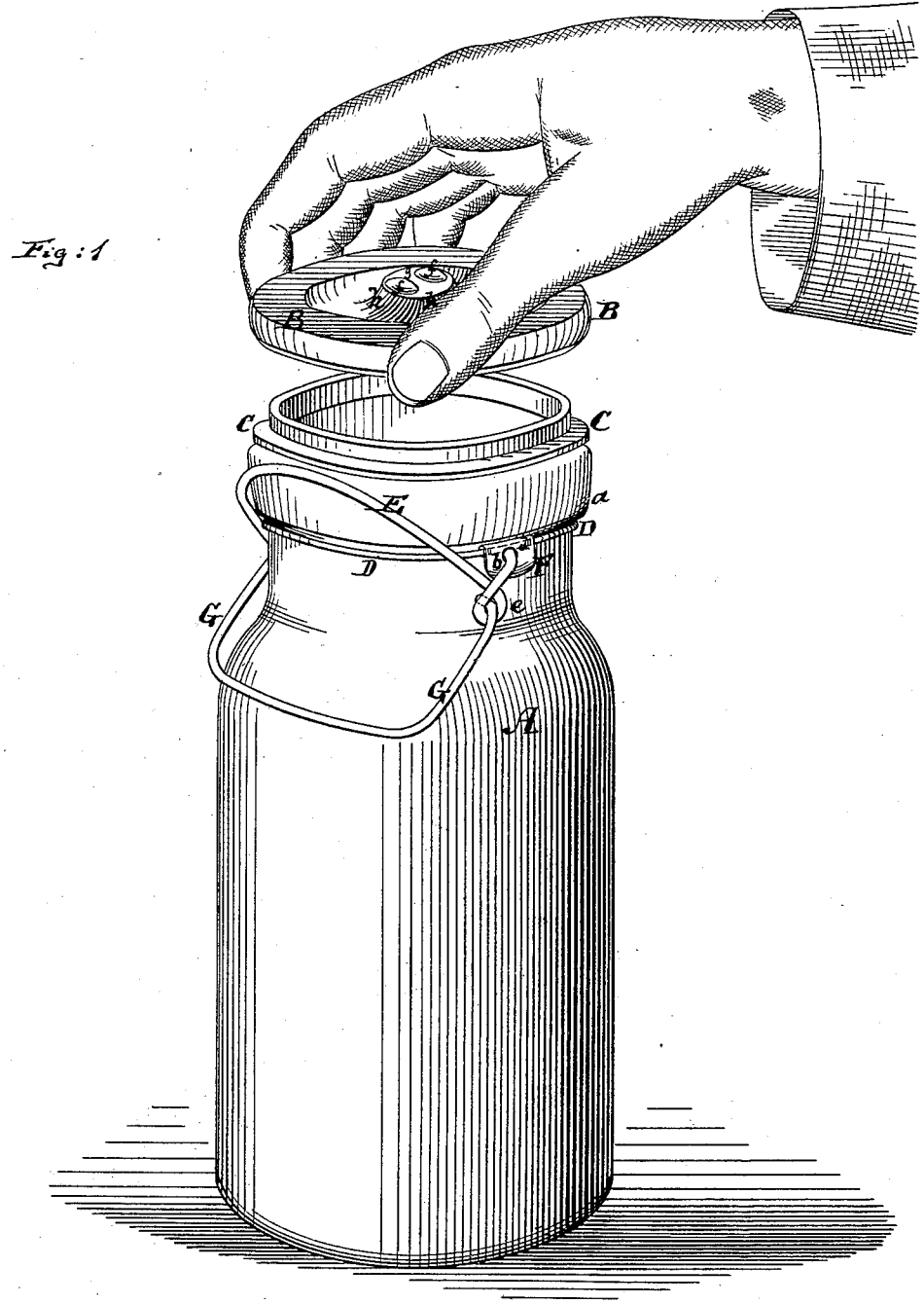
Fig: 1
Witnesses:
Henry F. Parker.
John C. Tunbridge.
Inventor:
Henry W. Putnam
by his attorneys
Briesen & Betts

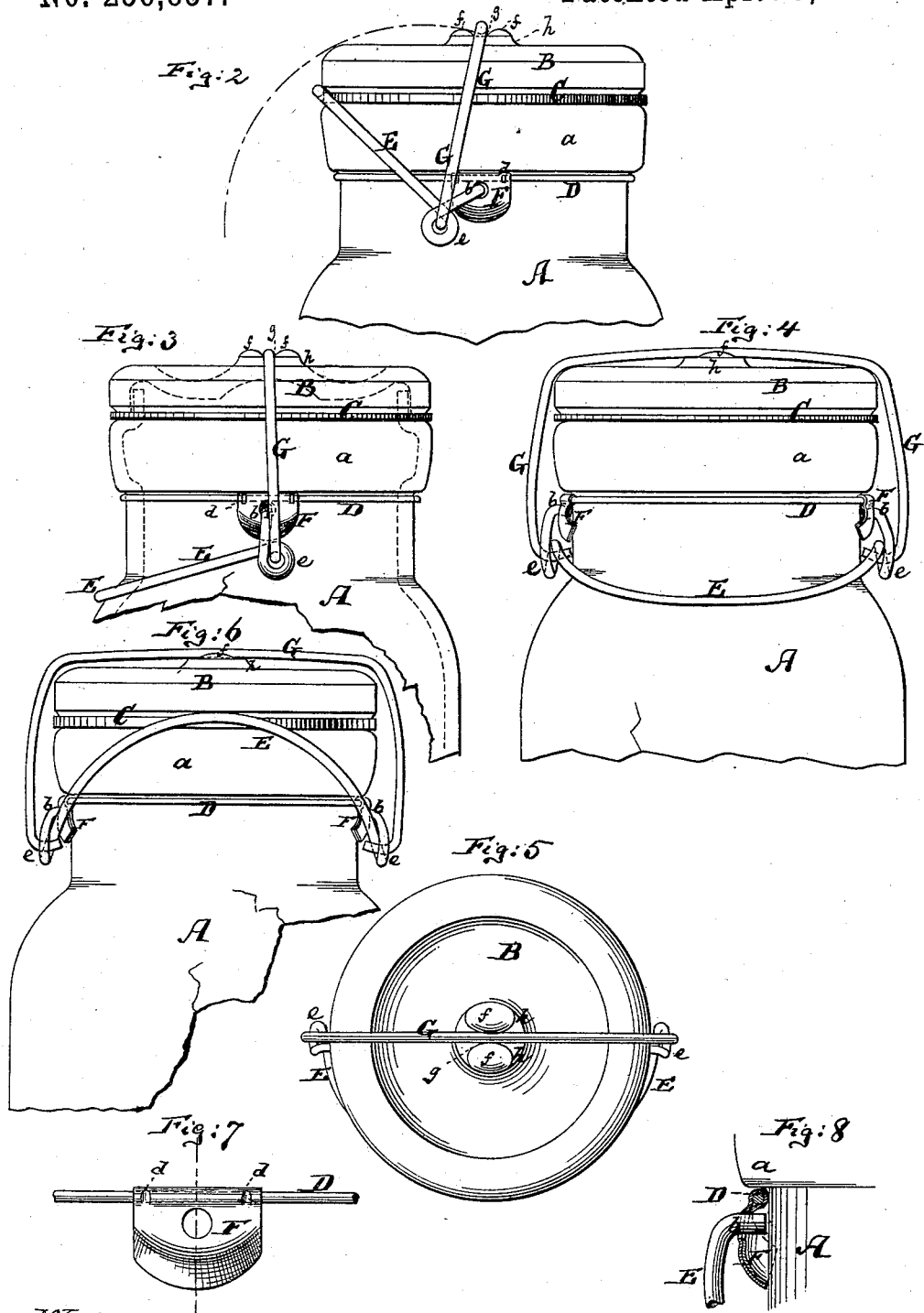

UNITED STATES PATENT OFFICE.

HENRY W. PUTNAM, OF BENNINGTON, VERMONT.

STOPPER FOR JARS, &c.

SPECIFICATION forming part of Letters Patent No. 256,857, dated April 25, 1882.

Application filed February 10, 1882. (Model.)

*To all whom it may concern:*

Be it known that I, HENRY W. PUTNAM, of Bennington, in the county of Bennington and State of Vermont, have invented an Improved Stopper for Jars and other Vessels and the like, of which the following is a specification.

Figure 1 is a perspective view of the jar, showing the cover partly lifted off. Fig. 2 is a side view, showing the lever raised while the bail is on the stopper or cover. Fig. 3 is a side view of the upper part of a jar having my improved stopper locked and held down. Fig. 4 is a face view of the same; Fig. 5, a top view thereof. Fig. 6 is a face view of the jar with the parts in the position shown in Fig. 2; Fig. 7, a detail side view, on an enlarged scale, of the sheet-metal ear which is attached to the neckband. Fig. 8 is a vertical cross-section of said ear on the enlarged scale.

This invention relates to improvements on devices for holding the covers of jars or other vessels tightly to their places and permitting their ready removal and replacement, and has for its object, in the first place, so to construct the parts that under the strain of the tightening devices that hold the cover down no part of the jar is liable to be injured; also, so to arrange the tightening devices that they can be readily moved aside, allowing the cover to be used entirely without them, and so that they can be as readily placed over the cover to lock it to the jar; also, to allow the cover to be held loosely on the jar by a bail without being locked and pressed down.

The invention consists, first, in providing the neckband of the jar with certain doubled metallic ears that project from it and serve to receive the pivotal ends of the locking-lever of the mechanism. These projecting ears are made of sheet metal, and are bridged or bent in such a way as to bear against the body or neck of the jar at a distance from the neck-wire, by which means the strain exercised by the locking action of the lever at the point where it connects with the neckband is distributed over a wider area along the jar than it otherwise would be, and the breakage of the jar at or near that place prevented. In other words, as far as this feature of my invention is concerned it consists in so enlarging the part of the neck-wire by means of said metallic ears, into which the lever enters, as to obtain a greater contact-surface with the body of the jar than is obtained where the end of the lever is merely fitted through a loop or eye formed wholly or in part by bends in the body of the neck-wire itself. I have found that where the lever bears simply on the neck-wire during the strain of locking, at which time the lever exercises considerable power in closing the cover, jars that are not of perfect construction are very liable to break, as the strain comes against two tangential contact-faces on the head of the jar only, whereas with my improvement applied even inferior jars can be securely closed and will be protected against breakage by the closing action of the lever.

The invention also consists in combining an eccentric lever and yoke or bail of the kind described in Letters Patent No. 158,406 with a cover which is not connected to the bail or lever, but only placed under the bail or yoke to be locked to the jar by the action of said yoke and lever, yet entirely separable from the jar when desired, and so proportioned with reference to the other parts of the mechanism that even when the lever is swung upward the cover will still be held in place by the bail.

The invention also consists in providing the cover itself with a central projection having a recess at the top into which the bail or yoke enters in straddling the detachable cover, for use in the combination hereinafter more fully described.

In the drawings, the letter A represents a suitable jar or vessel. B is its cover, fitted over the jar or vessel to close the same in suitable manner. A rubber ring or gasket, C, may be interposed between the cover and the jar. The jar, as well as the cover, may be made of glass, or either of them of other suitable substance, such as metal, hard rubber, composition, or the like. The jar is made with an enlargement or head, *a*, at its upper part, or with equivalent projection or projections to furnish a resisting surface to and above the neckband D, which is placed around the jar beneath said head or projection *a*.

I do not limit myself to any manner of holding the neckband in position on the jar. The neckband is preferably made of wire, and its object is to connect with the lever E of the locking apparatus, so as to furnish a bearing to said lever on opposite sides of the jar. For the reception of the ends *b* of the lever the neck-wire is provided with metallic ears F F, which ears are more completely shown in Figs. 7 and 8. Each ear is made of doubled sheet metal that is laid around the neck-wire D and made to project from it, and bulged outward, so that its end will bear against the body of the jar A, as is clearly shown in Fig. 8. Thus the ear is in bodily contact with the jar at a distance from the neckband, and under strain will create friction against the jar sufficient to take part of the strain from the lower edge of the projection *a* of the jar, which, under severe strain, might otherwise be apt to be torn off the body of the jar or otherwise ruptured. The ears F are perforated, either close to the wire D or at short distance from the same, as in Fig. 8, to receive the ends *b* of the lever E, that is thus suspended from said ears.

In order to fasten each ear F securely upon the wire D and prevent it from becoming displaced thereon, I either nick the ear, as at *d d* in Fig. 7, so as to partly embed it into the body of the wire, or form suitable shoulders on the wire near the ends of the ear; or I can secure the parts together by a drop of solder near each end, or otherwise. I prefer this more definite attachment of the ear to the wire, although the ear may be doubled so tightly over the wire, especially where a large wire is used, as to grip it with sufficient force to prevent longitudinal displacement without additional provision for the same purpose.

The lever E is substantially such a lever as is described in the above-mentioned patent, No. 158,406, and connects in its eyes *e e* with a bail or yoke, G, which also is substantially like the bail or yoke that is described in said patent; but instead of fastening the cover B to this bail or yoke I leave it separate therefrom, so that when the parts E and G are in the position which is shown in Fig. 1—namely, when the bail is swung aside to clear the cover—the latter can be lifted off and replaced on the jar, and the jar used without interference by said parts E G, as any common jar can be used; but when the cover is to be locked tightly, the parts are brought into the position shown in Figs. 3 and 4—that is to say, the cover being placed on the jar the bail G is carried over the cover, while the handle part of the lever is raised, (see Fig. 2,) until the bail is diametrically across the top of the cover, whereupon the lever E is swung down until it assumes the position shown in Fig. 3. By this movement the lever carries the bail down, causing it to press with great force upon the cover, and at the same time the bail is locked by the eccentric action of the lever that has already been specified in said Patent No. 158,406.

Thus I have produced a jar which is capable of being hermetically sealed by the mechanism which I have described, and which at the same time, when its contents are in greater or less use, can be opened and closed without interference with the mechanism that locks it, which feature I believe to be altogether new in fruit-jars, all of which as heretofore made with locking devices, either in form of screw-threads or of lugs and spiral ways for their reception, could only be opened and closed by using the devices that should finally lock them together, or, if not, such jars, when the covers could be opened and closed without interference with the locking mechanism, were at such time without any locking mechanism. According to my invention, however, the jar is always in condition to be locked, the locking devices are not liable to be lost from the jar, being always attached to it, and yet the jar can be used with freedom without them, which is a great convenience to ladies who may not wish to have to handle the locking devices every time a jar already in use is opened or closed.

As a further means of locking the cover in place I provide its top, at the center, with a central upward projection, *h*, having projecting lugs *f f*, between which a groove or depression, *g*, is formed, into which groove the straddling-bail will set in locking, as shown in Fig. 5. The projections *f* may be tapering to a greater or less extent, and will serve, even if not tapering, to prevent the cover from being pushed laterally away from under the straddling-bail. By making these projections *f f* circular the cover will be in position to properly receive the bail, even if not exactly aligned with the bail; but the more the said projections are elongated the more care must be taken that the depression or groove *g* between the projections is aligned with the bail before the latter is brought down. The groove *g* may, however, be formed in the top of the cover without the lugs *f*. By tapering the lugs *f* the cover may in some cases be turned after the bail is locked down, so as to carry said projections as wedges beneath the bail and insure a still firmer locking of the jar.

I desire it to be particularly understood that although the metallic ears F F on the neckband are shown in the mechanism D, E, and G, which is separable from the cover B, still I do not limit myself as far as these ears are concerned to their use on devices that combine with such a separable cover, because these ears, of the peculiar construction shown, will also be of advantage when used on mechanism which is pivotally or otherwise connected with the cover or stopper of a jar or bottle, as in Patent No. 158,406, or in analogous structures.

In packing jars for transportation before they are filled, and after they have been just made, it is a common experience that the new rubber gasket placed between the newly-made jar and cover, if the cover is held to the jar under pressure, is liable to become cemented to the jar and cover in such a way as to interfere with the removal of the cover and involve the destruction of the gasket. With my mechanism I can obviate this difficulty with ease, because for transportation I can leave the jar in the position shown in Figs. 2 and 6—to wit, carry the bail over the cover into the groove $g$ of the cover, but leave the lever E raised, as shown in those figures. The groove $g$ is deep enough to receive the bail even in this position, and to prevent the cover, under the jarring action of the vehicle in which the article may be transported, from sliding out from beneath the bail. Hence the bail holds the cover to its place, but not under pressure, the pressure being produced only by lowering the lever into the position shown in Fig. 3, and therefore the rubber gasket is held between the jar and cover, but not under pressure, thus obviating the danger of cementing these parts together.

The bail G in Fig. 6 is shown to rest on the central projection, $h$, of the cover, but does not touch the cover at or near the periphery; but when the lever is swung down the bail is sprung down, as in Fig. 4, to touch the cover at or near the periphery also. This advantage of obtaining central pressure and final peripheral contact is obtained by providing the cover with the central projection or elevation, $h$.

I claim—

1. The combination of the jar A, having shoulder $a$, with the neckband D, and with the sheet-metal ears F, that are doubled around and below the neckband, bent or curved inward against the body of the jar, and perforated below the neckband through its two thicknesses to receive the actuating-lever of the jar or bottle closing apparatus and the upward strain thereof, and that bear against the shoulder $a$, substantially as specified.

2. The combination, with a jar, of a fastening consisting of the eccentric lever E, straddling the jar and forming a handle at the side thereof, combined with the bail or yoke G, that is pivoted to it, and with horizontal supporting and suspending devices on the jar A, and with the cover, that is disconnected from said bail or yoke and from said pivoted lever, the proportions and arrangement of said elements being such that when the lever is raised against the vessel the yoke will hold the cover loosely in position, and when depressed will hold it tightly in position, substantially as herein shown and described.

3. The combination of a jar and its cover B, having recess or groove $g$ on the raised part $h$ of its top, with the springing bail or yoke and eccentric lever pivoted to the jar, all arranged and proportioned so as to allow the bail to hold the cover loosely when the lever is raised against the jar, and the cover to be taken off when said lever is so raised by springing the bail out of the groove or recess $g$, substantially as herein shown and described.

HENRY W. PUTNAM.

Witnesses:
WILLY G. E. SCHULTZ,
WILLIAM H. C. SMITH.